June 20, 1939.  C. A. CAMPBELL  2,163,189
LUBRICATING SYSTEM FOR ROTARY BRAKE VALVES
Filed Feb. 23, 1938  2 Sheets-Sheet 1
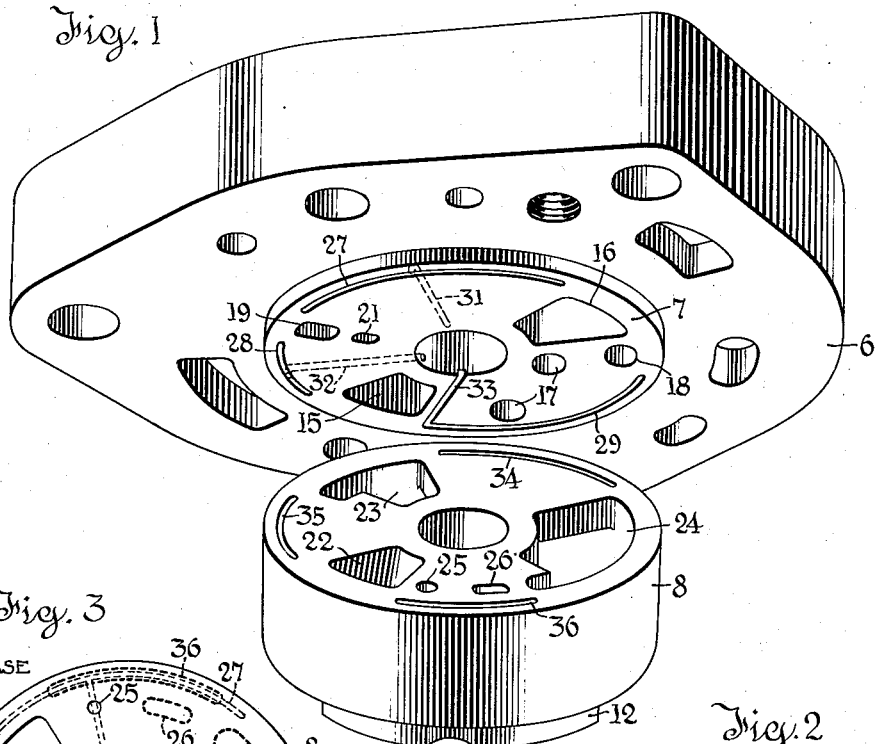
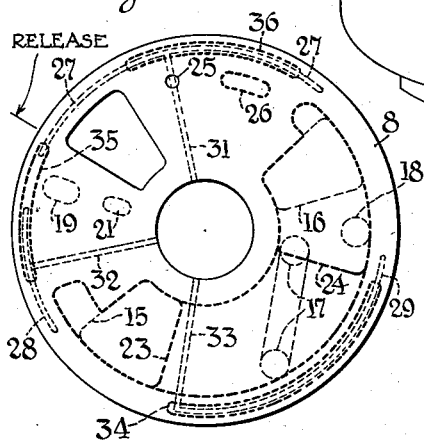
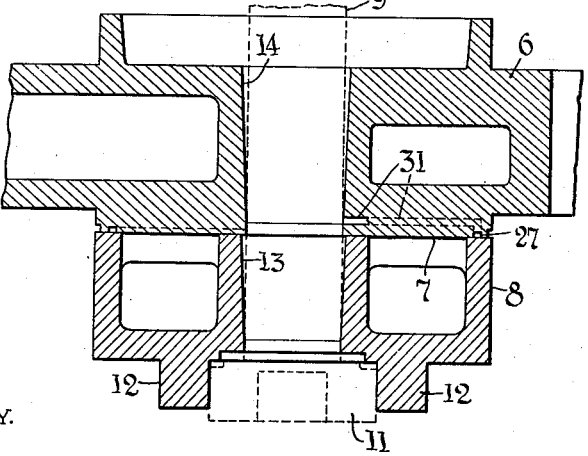
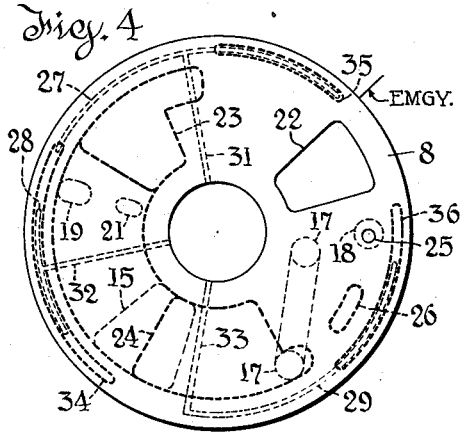
Inventor
Charles A. Campbell
By
Dodge and Sons
Attorneys June 20, 1939.   C. A. CAMPBELL   2,163,189
LUBRICATING SYSTEM FOR ROTARY BRAKE VALVES
Filed Feb. 23, 1938   2 Sheets-Sheet 2

Inventor
Charles A. Campbell
By
Dodge and Sons
Attorneys

Patented June 20, 1939

2,163,189

UNITED STATES PATENT OFFICE 2,163,189

LUBRICATING SYSTEM FOR ROTARY BRAKE VALVES

Charles A. Campbell, Watertown, N. Y., assignor to The New York Air Brake Company, a corporation of New Jersey Application February 23, 1938, Serial No. 192,106

5 Claims. (Cl. 303—56)

This invention relates to air brakes and particularly to lubrication of the rotary valve forming a component of engineers' brake valves.

The invention will be described as embodied in the rotary valve of a U—1 brake valve because that valve can be converted to operate as a straight air valve or an automatic valve, selectively. The selection is made by a changeover valve which converts ports in the rotary valve seat from one to another function, so that in one setting a given port might be, say a brake pipe port, and in the other setting the same port might be an atmospheric (exhaust) port. A valve of this type presents a peculiarly difficult problem because the lubricating grooves must never short-circuit the valve (i. e., afford unwanted connection between two ports or between a port and the atmosphere). Communications permissible in one setting are likely to be objectionable in the other. For this reason the application of the lubricating scheme to the U—1 valve, gives a particularly clear illustration of the value of the invention.

The U—1 valve herein described in part, forms the subject matter of my application Serial No. 75,004, filed April 7, 1936, since issued on November 15, 1938, as Patent 2,136,582, and no claim is here made to the brake valve. On the contrary, it is illustrated merely to permit explanation of the lubricating device herein claimed.

In the accompanying drawings:

Fig. 1 is a perspective view of the valve seat element and of the rotary valve slightly separated to show the porting.

Fig. 2 is an axial section through the valve seat and valve.

Fig. 3 is a view looking upward at the rotary valve in release position on its seat, the seat ports and lubricating ports being indicated in dotted lines.

Fig. 4 is a view similar to Fig. 3 showing emergency position.

Figure 5:
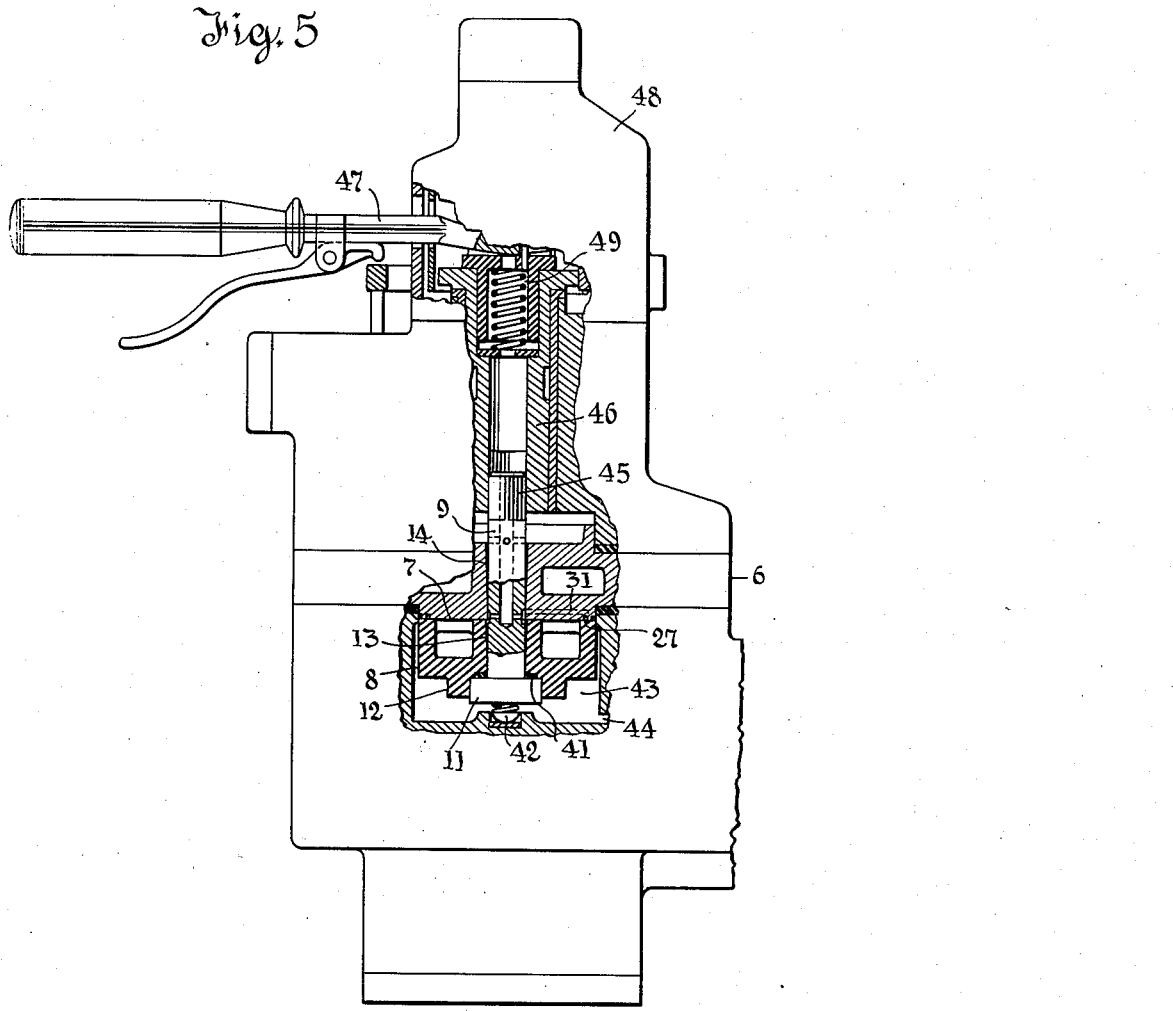
Fig. 5 is an elevation of the U—1 brake valve with portions broken away to show material aspects of the internal construction.

6 represents the rotary valve seat member forming a component of the engineer's brake valve and as shown this has a boss forming a raised seat 7 for a rotary valve 8. The valve 8 is turned by a stem or key 9 which extends outward through the seat member and is operated by a handle hereinafter described. The stem 9 has a head 11 which is confined between lugs 12 on the rotary valve member to afford a driving connection between the stem and the rotary valve. The stem 9 is cylindrical, but the opening in the valve 8, and also that in the seat member 6 is slightly tapered, as indicated at 13 and 14, these tapers being to afford clearances which serve as oil retaining pockets which may be fed with oil by any suitable means.

As best shown in Fig. 5, the head 11 seats on the gasket 41 and when the system is not charged, the valve 8 is held to its seat by the coil spring thrust unit 42. However, when the system is charged, supply pressure is admitted to the chamber 43 through the port 44. Thus, the valve 8 is normally held to its seat by supply pressure, but the stem 9 and the space around this stem are not subject to such pressure.

The stem 9 is squared at its upper end as indicated at 45 to engage a corresponding squared aperture in the lower end of the sleeve 46. This sleeve is turned by a removable handle 47 whose range of motion is limited by the cap portion 48. This handle 47 enters between lugs (not shown) on the upper end of the sleeve 46. The spring mechanism and associated sleeve generally appearing at 49 are parts of a dead-man mechanism with which the present invention is not concerned.

So far as the invention is concerned, the important point is that oil in the tapered spaces 13 and 14 is under atmospheric pressure only, and that the feed to the ports 31 and 32 and groove 33 is simple gravity feed.

The porting of the valve seat and valve are more or less incidental to the invention, so that it is necessary merely to identify the ports in general terms. As already stated, the U—1 brake valve includes a changeover valve (not shown) which in two different settings establishes two different connections to ports in seat 7.

Referring first to the seat, the port 15 is an atmospheric or exhaust port in straight air setting and is the brake pipe port in the automatic setting. The port 16 is the control port in straight air setting and offers a direct connection to the main reservoir in automatic setting. The two ports 17 have no function in the straight air setting but are equalizing reservoir ports in automatic setting. Port 18 is the service pilot port effective only in straight air setting. Port 19 is an exhaust port in straight air setting and has no function in automatic setting. Port 21 has no function in straight air setting and is an exhaust port in automatic setting.

Turning now to the rotary valve, 22 is a through port extending through the rotary valve 8 and supplies main reservoir air which is admitted against the back of the rotary valve 8 at all times. The cavities 23 and 24 are connected with each other within the body of the rotary valve 8. The port 25 is a through port coacting with port 18, leading through the rotary valve 8, and consequently subject to main reservoir pressure, which as stated acts on the back of the valve. The cavity 26 functions in straight air setting only, in which setting in service position it connects the control port 16 with the service pilot port 18.

Formed in the face of the seat 7 are three arcuate grooves 27, 28 and 29. These are all struck at the same radial distance from the axis of rotation of the valve and are all wholly outside the ports in the seat as well as outside the rotary ports and cavities in the rotary valve. The groove 27 is connected with the tapered bore 14 by means of a radial drilled oil passage 31. Groove 28 is similarly connected with the bore 14 by the radial drilled passage 32. It will be observed that both these passages are in the body of the seat and are not exposed on the face of the seat. The groove 29 is connected with the bore 14 by a radial groove 33 cut in the face of the valve seat 7. There are three disconnected arcuate grooves 34, 35 and 36 cut in the face of the rotary valve and so arranged that as the rotary valve moves between its two limits of motion, as indicated in Figs. 3 and 4, the grooves 34, 35 and 36 in the rotary valve engage and are fed with oil by the grooves 27, 28 and 29 in the seat. The radial groove 33 is the only one in the face of the seat within the area traversed by ports or cavities in valve 8. The groove 33 is overlain most of the time by the flat surface of the rotary valve between the cavities 23 and 24.

Study of Figs. 3 and 4 will indicate, however, that although the groove 33 is in contact with the flat surface of the rotary valve between the cavities 23 and 24 in the rotary valve, in release position, Fig. 3, and also as the valve moves through lap and service positions, it engages cavity 23 shortly before emergency position is reached and after it is reached. In emergency position cavity 23 is always at atmospheric pressure whether the valve be set for straight air or for automatic control. This follows from the fact that in emergency position cavity 23 is in direct communication with the seat port 15. The seat port 15, during straight air setting, is an atmospheric exhaust port. In automatic setting it is the brake pipe port, but in automatic emergency the brake pipe is necessarily vented to atmosphere by means other than valve 8. Consequently, the groove port 33 never communicates with any port in the valve seat except when such port is at atmospheric pressure. Thus it does not function to short-circuit the valve or to permit any loss of pressure or leakage. As a consequence, gravity feed oiling with a complete absence of any tendency to blow the oil out through the ports (a defect inherent in prior art constructions) is secured.

The groove port 33 serves the very useful purpose of supplying oil over substantially the entire radial dimension of the rotary valve. Experience with this lubricating system has shown that the valve is thoroughly lubricated without the slightest impairment of its sealing qualities.

The arrangement therefore supplies a long felt need. Precise location of the radial surface oil groove is a function in the design of the valve but inasmuch as the convertible straight-air automatic valve offers a peculiarly difficult problem because of the interchange of port connections, the disclosure herein made is believed to illustrate the principle of the invention and to indicate the manner in which it might be applied to simpler valves.

What is claimed is:

1. The combination of an engineer's brake valve comprising a seat and a rotary valve thereon, each of which is ported so that rotary shifting of the valve serves to establish pressure and exhaust connections with ports in the seat, the seat being provided with at least one arcuate oil channel in its face outside the area traversed by ports in the rotary valve and having an oil feed groove extending from the central portion of the seat to said arcuate channel across the face of the seat and so arranged as to engage a port in the valve only when the latter is connected to exhaust; and means for supplying oil to the last named groove under atmospheric pressure.

2. The combination of an engineer's brake valve comprising a seat and a rotary valve thereon, each of which is ported so that rotary shifting of the valve serves to establish pressure and exhaust connections with ports in the seat, the seat and valve each having discontinuous registering arcuate oil grooves outside the ports in both valve and seat, and the seat having an oil feed groove on its face leading from the central portion thereof to one of the first named grooves and so arranged as to engage a valve port only when the latter is connected to exhaust; and means for supplying oil to the last named groove under atmospheric pressure.

3. The combination of an engineer's brake valve comprising a seat and a rotary valve thereon, each of which is ported so that rotary shifting of the valve serves to establish pressure and exhaust connections with ports in the seat, the seat and valve each having discontinuous registering arcuate oil grooves outside the ports in both valve and seat, and the seat having an oil feed groove on its face leading from the central portion thereof to one of the first named grooves and so arranged as to engage a valve port only when the latter is connected to exhaust; means for supplying oil to the last named groove under atmospheric pressure; and separate means for supplying oil to at least one other of the arcuate grooves under atmospheric pressure.

4. In an engineer's brake valve, the combination of a ported seat; a ported valve mounted to rotate thereon and subject to supply pressure on its face remote from said seat whereby such pressure urges said valve toward its seat; an actuating stem extending through an opening in the seat and engaging the valve to actuate the same, said stem where it passes through the seat being protected from supply pressure, the stem and said opening conjointly affording a restricted oil feeding passage; and means for lubricating the mating faces of the valve and seat and comprising grooves therein including an oil feeding groove leading generally radially from said restricted passage and so located with reference to the porting of the valve and seat that when it opens into a port in the opposed surface that port is then connected to atmosphere, and arcuate interengaging grooves in both mating surfaces and wholly in areas not traversed by ports at least one such arcuate groove communicating with said radial groove.

5. In an engineer's brake valve, the combination of a ported seat; a ported valve mounted to rotate thereon and subject to supply pressure on its face remote from said seat whereby such pressure urges the valve toward its seat; an actuating stem extending through an opening in the seat and engaging the valve to turn the same, said stem where it passes through the seat being protected from supply pressure, said seat being provided with at least one arcuate oil channel in its face and wholly in the areas not traversed by ports in the valve, and said seat also being provided with an oil feed groove leading across the face of the seat, from the opening in the seat in which the stem turns to said channel, said feed groove being so located as to engage a valve port only when the latter is connected to atmosphere; and means forming a restricted oil passage adjacent said stem and leading to said groove.

CHARLES A. CAMPBELL.